US00RE41098E

(19) United States
(12) Reissued Patent
Yu

(10) Patent Number: US RE41,098 E
(45) Date of Reissued Patent: Feb. 9, 2010

(54) VEHICLE HANDLEBAR GRIP

(76) Inventor: Teal-Yun Yu, No. 1-2, Lane 1147, Sec. 1, Chung San Road, Ta Chia Chen, Taichung Hsien (TW)

(21) Appl. No.: 11/340,812

(22) Filed: Jan. 27, 2006

Related U.S. Patent Documents

Reissue of:
(64) Patent No.: 6,681,653
Issued: Jan. 27, 2004
Appl. No.: 10/140,070
Filed: May 8, 2002

(30) Foreign Application Priority Data

Mar. 6, 2002 (TW) ..... 91202563 U

(51) Int. Cl.
*B62K 21/26* (2006.01)
*B62K 21/12* (2006.01)
*B62D 1/06* (2006.01)
*F16D 1/08* (2006.01)

(52) U.S. Cl. ..... 74/551.9; 74/551.8; 74/558; 403/362

(58) Field of Classification Search ..... 74/551.1, 74/551.8, 551.9, 558, 558.5; 403/109.1, 362; 16/421, 422; *B62K 21/26*
See application file for complete search history.

(56) References Cited

U.S. PATENT DOCUMENTS 296,973 A * 4/1884 Kelsey ..... 74/551.9
571,394 A * 11/1896 Prindle ..... 74/551.8
586,830 A * 7/1897 Williams ..... 74/551.9
4,966,047 A * 10/1990 Krauer et al. ..... 74/502.2
5,125,286 A * 6/1992 Wilson ..... 74/551.9
5,197,927 A * 3/1993 Patterson et al. ..... 474/80
5,280,735 A * 1/1994 Kuipers et al. ..... 74/551.9
5,983,747 A * 11/1999 Chen ..... 74/551.9
6,561,058 B1 * 5/2003 Steinke ..... 74/551.9
2003/0084747 A1 * 5/2003 Bendetti et al. ..... 74/551.9
2007/0039407 A1 * 2/2007 Wu ..... 74/543
2007/0157758 A1 * 7/2007 Shih ..... 74/551.9

OTHER PUBLICATIONS

Webster's II New Riverside University Dictionary, 1994, p. 1012.*

* cited by examiner

*Primary Examiner*—Vinh T. Luong
(74) *Attorney, Agent, or Firm*—Browdy and Neimark, PLLC

(57) ABSTRACT

A vehicle handlebar grip for use in a bicycle or motorcycle [is disclosed] to include a plastic grip body peripherally covered with a flexible covering, the grip body having an axially extended mounting hole for mounting onto the vehicle handlebar, two annular end grooves at two ends, and two radial through holes in communication with the annular end grooves, two locating rings respectively fitted into the end grooves of the grip body, the locating rings each having a radial screw hole, and two tightening up screws respectively inserted through the through holes of the grip body and threaded into the screw holes of the locating rings to fix the locating rings and the grip body to the vehicle's handlebar.

9 Claims, 2 Drawing Sheets

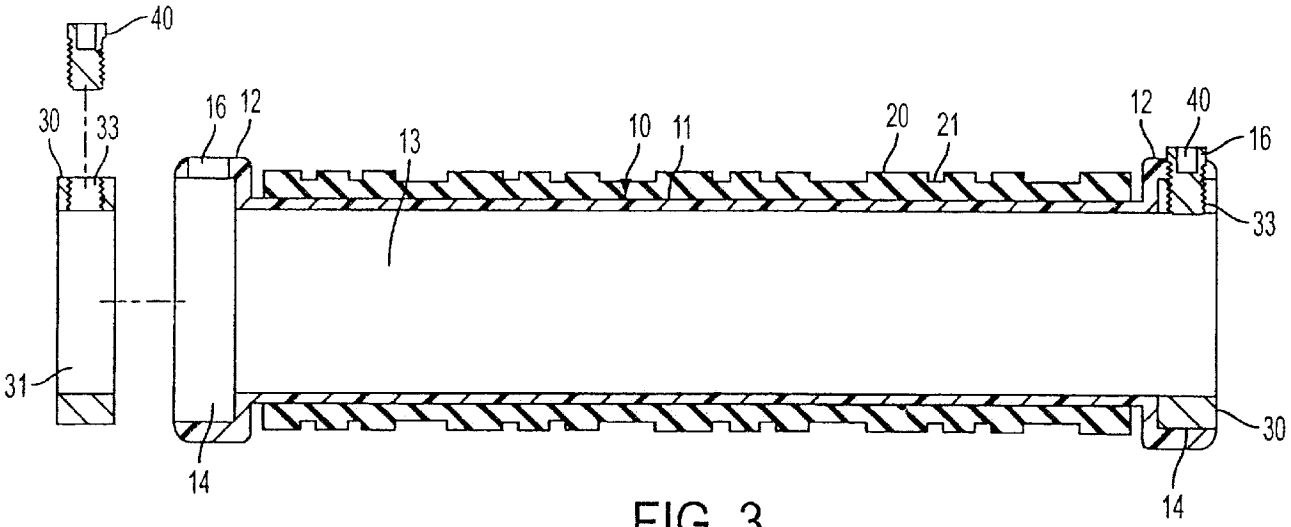
FIG. 3
AMENDED

VEHICLE HANDLEBAR GRIP

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to vehicles, such as bicycles motorcycles, tricycles, etc., and, more specifically, to a grip for the handlebar of a vehicle.

2. Description of the Related Art

A bicycle, motorcycle, tricycle, etc., has handlebars for the holding of the rider's hands. Regular vehicle handlebars are commonly made of metal and mounted with a flexible grip for the holding of the hand comfortably. The grip of a regular vehicle handlebar is a tubular rubber member of diameter slightly smaller than the handlebar. During installation, an air compressor is operated to drive forced air into the tubular rubber grip so as to expand the inner diameter of the tubular rubber grip, enabling the tubular grip to be sleeved onto the metal handlebar. After installation, the elastic material property causes the tubular rubber grip to return to its former shape, and therefore the tubular rubber grip is positively secured to the handlebar. When removing the grip from the handlebar, it is necessary to drive forced air into the inside of the grip again and to apply lubricating oil to the gap in between the inner diameter of the grip and the outer diameter of the handlebar. These grip mounting and dismounting procedures are complicated and require special tools and techniques.

SUMMARY OF THE INVENTION

The present invention has been accomplished to provide a vehicle handlebar grip, which eliminates the aforesaid drawbacks. It is therefore the main object of the present invention to provide a vehicle handlebar grip, which can easily be installed in the handlebar of a vehicle, or quickly removed from the handlebar of the vehicle. To achieve this object of the present invention, the vehicle handlebar grip comprises a plastic grip body, the plastic grip body comprising an mounting hole axially extended through two distal ends thereof, two annular locating grooves respectively disposed at the two distal ends around the mounting hole, and at least one through hole radially disposed in each of the two distal ends in communication with the mounting hole; an outer covering covered on the periphery of the grip body, the outer covering having a material hardness lower than the grip body; two metal locating rings respectively fitted into the annular locating grooves of the grip body around the mounting hole, the locating rings each having at least one radial screw hole corresponding to the through holes of the grip body; and a plurality of tightening up screws adapted for inserting into the through holes of the grip body and threaded into the screw holes of the locating rings to fix the locating rings and the grip body to the vehicle's handlebar onto which the grip body, the locating rings and the grip body are sleeved.

BRIEF DESCRIPTION OF THE DRAWINGS

FIG. 3 is a sectional view in axial direction of the vehicle handlebar grip shown in FIG. 1.

DETAILED DESCRIPTION OF THE PREFERRED EMBODIMENT

Figure 1:
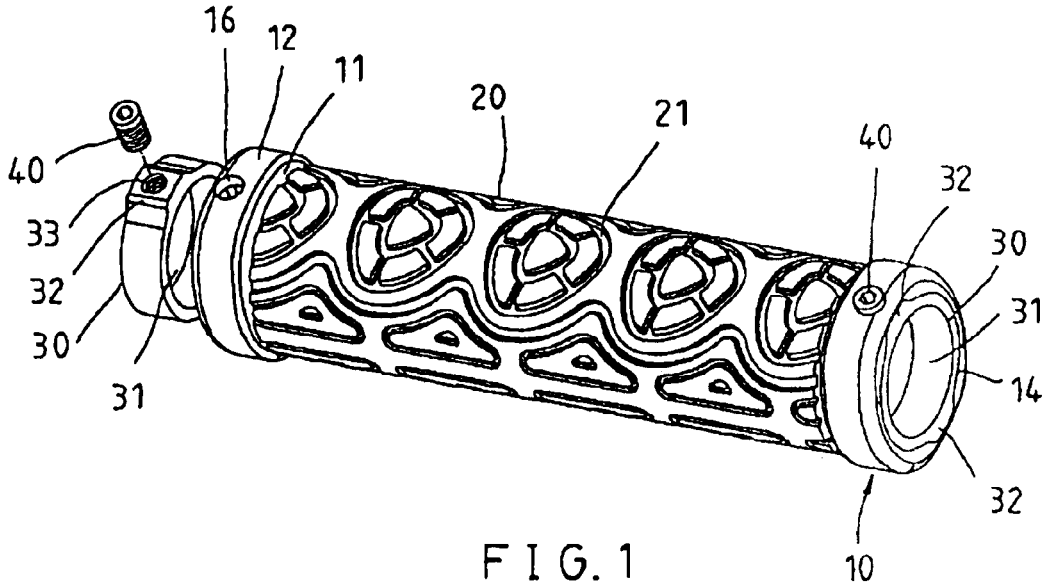
FIG. 1 is a perspective, partially exploded view of a vehicle handlebar grip according to the present invention.
Figure 2:
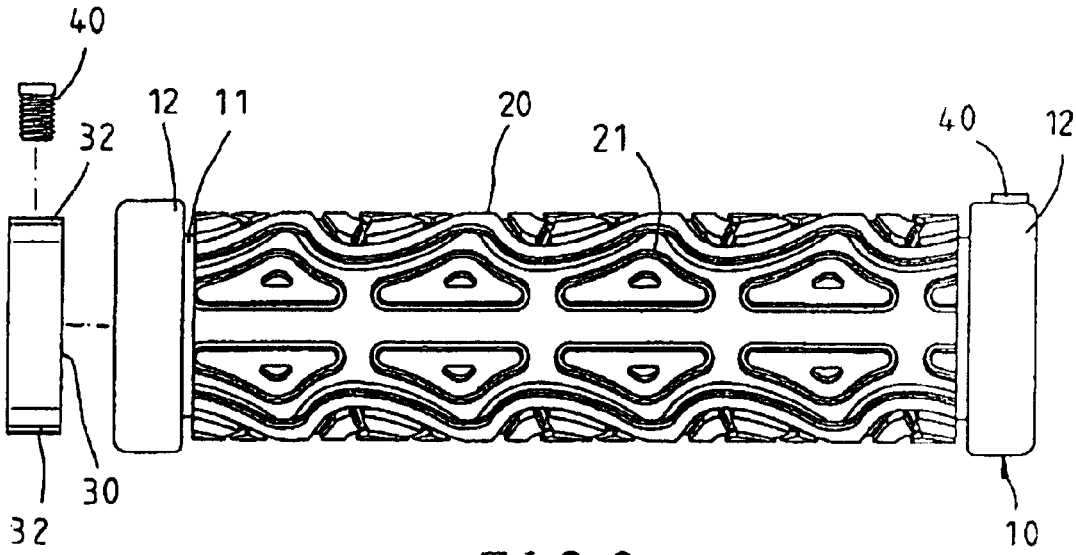
FIG. 2 is a front view of the vehicle handlebar grip shown in FIG. 1.

Referring to FIGS. from 1 through 5, a vehicle handlebar grip in accordance with the present invention is shown comprised of a grip body 10, an outer covering 20, two locating rings 30, and two tightening up screws 40.

The grip body 10 is injection-molded from plastics, comprising a base 11, two annular end flanges 12 respectively formed integral with the ends of the tubular base 11, a mounting hole 13 axially extended through the ends of the base 11, two annular locating grooves 14 respectively defined within the end flanges 12 around the mounting hole 13, two recessed positioning portions 15 respectively formed in the inner diameter of the end flanges 12 in communication with the locating grooves 14 at two sides.

Figure 5:
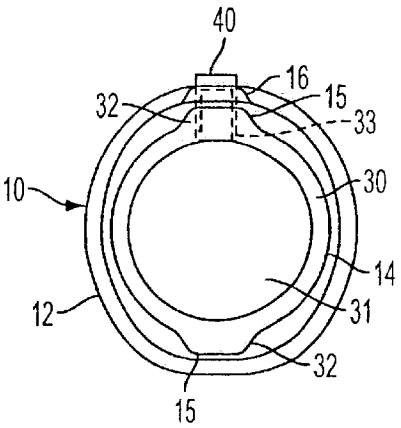
FIG. 5 is an end view of the vehicle handlebar grip shown in FIG. 1.
Figure 4:
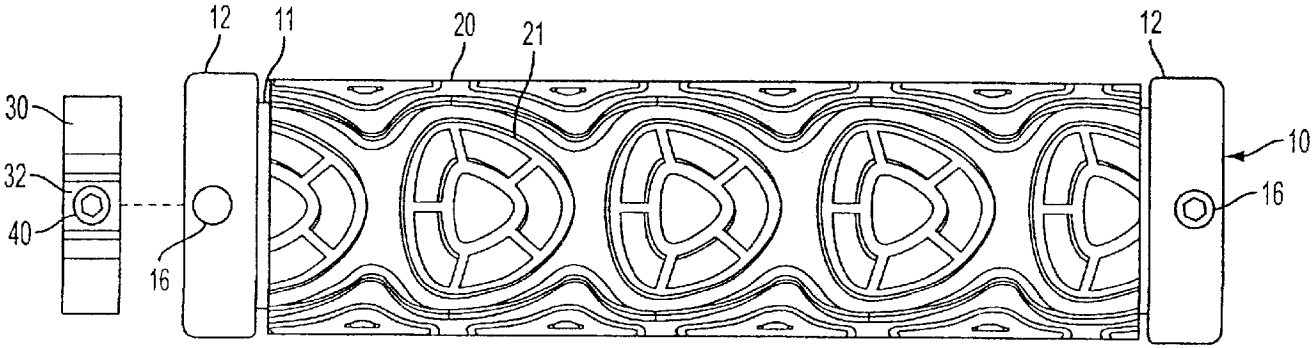
FIG. 4 is a top view of the vehicle handlebar grip shown in FIG. 1.

The outer diameter of the end flanges 12 is greater than the tubular base 11. The end flanges 12 have two through holes 16 respectively radially disposed in communication with the recessed positioning portions 15 (see FIG. 5).

The outer covering 20 is a tubular member covered on the periphery of the tubular base 11 between the end flanges 12, having an embossed design 21 in the outer surface. The outer diameter of the outer cover 20 is smaller than the end flanges 12. The length of the outer covering 20 is approximately equal to (preferably slightly smaller than) the tubular base 11. The outer covering 20 is directly injection-molded from gel (or rubber) onto the periphery of the tubular base 11.

The locating rings 30 are made of aluminum alloy. The diameter of the hollow core 31 of the locating rings 30 is equal to the mounting hole 13. The outer diameter of the locating rings 30 fits the annular locating grooves 14. The locating rings 30 each have two radially protruded engagement portions 32 respectively forced into engagement with the recessed positioning portions 15 of the grip body 10 (see FIG. 5), and a screw hole 33 radially extended through one engagement portion 32 corresponding to one through hole 16 of the corresponding end flange 12. When inserting the locating rings 30 into the locating grooves 14 of the grip body 10, the radially protruded engagement portions 32 are respectively forced into engagement with the recessed positioning portions 15 of the grip body 10 to stop the locating rings 30 from rotary motion relative to the grip body 10, keeping the screw hole 33 in alignment with the corresponding through holes 16 of the grip body 10.

The tightening up screws 40 are socket head screws respectively inserted through one through hole 16 of each of the end flanges 12 of the grip body 10 and threaded into the screw holes 33 of the locating rings 30.

During installation of the grip in the handlebar of the vehicle (bicycle or motorcycle), the tightening up screws 40 are loosened (rotated radially backwards from the inner diameter of the locating rings 30, and then the mounting hole 13 of the grip body 10 of the grip is coupled to the handlebar of the vehicle (the diameter of the mounting hole 13 and the inner diameter 31 of the locating rings 30 are slightly greater than the outer diameter of the vehicle's handlebar so that the grip can easily be sleeved onto the vehicle handlebar), keeping the outer end of the grip, i.e., the outer end of one locating ring 30 disposed in flush with the outer end of the vehicle's handlebar, and then the tightening up screws 40 are fastened tight with a hand tool to fix the grip to the vehicle's handlebar. When loosening the tightening up screws 40, the user can easily remove the grip from the vehicle's handlebar.

As indicated above, the design of the present invention enables the user to conveniently quickly install the grip in a vehicle handlebar or to conveniently quickly remove the grip from the vehicle handlebar without a special tool or technique.

Further, the invention achieves a satisfactory balance between practicability and manufacturing cost. If the metal locating rings are eliminated and screw holes are directly formed in the ends of the plastic grip body, the strength of the grip body will be insufficient for the installation of the tightening up screws. If the base of the grip body is directly made of metal, the strength of the base will be high, however, the manufacturing cost of the grip body will be relatively increased and, the outer covering will be easily moved on the metal grip body.

Although a particular embodiment of the invention has been described in detail for purposes of illustration, various modifications and enhancements may be made without departing from the spirit and scope of the invention, for example, the locating rings can be made having multiple screw holes corresponding to multiple through holes at each end of the grip body for the mounting of a respective tightening up screw to fix the locating rings and the grip body to a vehicle handlebar. Accordingly, the invention is not to be limited except as by the appended claims.

What is claimed is:

1. A vehicle handlebar grip comprising:

a plastic grip body, said plastic grip body comprising [an] *a* mounting hole axially extended through two distal ends thereof, two annular locating grooves respectively disposed at the two distal ends around said mounting hole, and at least one through hole radially disposed in each of the two distal ends in communication with said mounting hole;

an outer covering covered on the periphery of said grip body, said outer covering having a material hardness lower than said grip body;

two metal locating rings respectively fitted into the annular locating grooves of said grip body around said mounting hole, said locating rings each having a hollow core having a diameter substantially equal to that of said mounting hole of the grip body, and at least one radial screw hole corresponding to the through holes of said grip body; and a plurality of screws respectively inserted into the through holes of said grip body and threaded into the screw holes of said locating rings and being capable of protruding in said hollow core of respective said location ring.

2. The vehicle handlebar grip as claimed in claim 1, wherein said grip body comprises a tubular base defining said mounting hole, and two end flanges formed integral with two ends of said tubular base around said mounting hole, said end flanges defining with the ends of said tubular base said annular locating grooves; said outer covering is covered on the periphery of said tubular base.

3. The vehicle handlebar grip as claimed in claim 1, wherein said grip body further comprises at least one recessed positioning portion internally disposed in each of the two distal ends thereof; said locating rings each have at least one engagement portion respectively radially protruded from the periphery thereof for engaging the at least one recessed positioning portion of said grip body.

4. The vehicle handlebar grip as claimed in claim 1, wherein said outer covering is injection-molded from gel on the periphery of said grip body.

5. The vehicle handlebar grip as claimed in claim 1, wherein said outer covering has an embossed design in the periphery thereof.

*6. A vehicle handlebar grip comprising:*

*a plastic grip body, said plastic grip body comprising a mounting hole axially extended through two distal ends thereof, an annular locating groove disposed at one of the two distal ends around said mounting hole, and a through hole radially disposed in said one of the two distal ends in communication with said mounting hole;*

*an outer covering covered on the periphery of said grip body, said outer covering having a material hardness lower than said grip body;*

*a metal locating ring fitted into the annular locating groove of said grip body around said mounting hole, said locating ring having a hollow core having a diameter substantially equal to that of said mounting hole of the grip body, and a radial screw hole corresponding to the through hole of said grip body; and*

*a screw inserted into the through hole of said grip body and threaded into the screw hole of said locating ring and being capable of protruding in said hollow core of said location ring,*

*wherein said grip body comprises a tubular base defining said mounting hole, and two end flanges formed integral with two ends of said tubular base around said mounting hole, one of said end flanges defining with one of the ends of said tubular base said annular locating groove; said outer covering is covered on the periphery of said tubular base.*

*7. The vehicle handlebar grip as claimed in claim 6, wherein said outer covering is injection-molded from gel on the periphery of said grip body.*

*8. A vehicle handlebar grip comprising:*

*a plastic grip body, said plastic grip body comprising a mounting hole axially extended through two distal ends thereof, an annular locating groove disposed at one of the two distal ends around said mounting hole, and a through hole radially disposed in said one of the two distal ends in communication with said mounting hole;*

*an outer covering covered on the periphery of said grip body, said outer covering having a material hardness lower than said grip body;*

*a metal locating ring fitted into the annular locating groove of said grip body around said mounting hole, said locating ring having a hollow core having a diameter substantially equal to that of said mounting hole of the grip body, and a radial screw hole corresponding to the through hole of said grip body; and*

*a screw inserted into the through hole of said grip body and threaded into the screw hole of said locating ring and being capable of protruding in said hollow core of said location ring,*

*wherein said grip body further comprises a recessed positioning portion internally disposed in said one of the two distal ends thereof; said locating ring have an engagement portion radially protruded from the periphery thereof for engaging the recessed positioning portion of said grip body.*

*9. The vehicle handlebar grip as claimed in claim 8, wherein said outer covering has an embossed design in the periphery thereof.*

* * * * *

UNITED STATES PATENT AND TRADEMARK OFFICE

CERTIFICATE OF CORRECTION

PATENT NO. : RE41,098 E
APPLICATION NO. : 11/340812
DATED : February 9, 2010
INVENTOR(S) : Tsai-Yun Yu It is certified that error appears in the above-identified patent and that said Letters Patent is hereby corrected as shown below:

On the Title Page
Item (76) Inventor, correct the incorrectly spelled name by deleting "Teal-Yun Yu" and insert --Tsai-Yun Yu--.

Signed and Sealed this
Thirteenth Day of September, 2011

David J. Kappos

David J. Kappos
*Director of the United States Patent and Trademark Office*